United States Patent
Blevins (10) Patent No.: US 10,548,295 B2
(45) Date of Patent: Feb. 4, 2020

(54) AUTOMATIC LIVESTOCK FEEDER

(71) Applicant: Timothy Donald Blevins, De Kalb, TX (US)

(72) Inventor: Timothy Donald Blevins, De Kalb, TX (US)

(73) Assignee: Timothy Donald Blevins, DeQween, AR (US)

(*) Notice: Subject to any disclaimer, the term of this patent is extended or adjusted under 35 U.S.C. 154(b) by 166 days.

(21) Appl. No.: 15/657,107

(22) Filed: Jul. 21, 2017

(65) Prior Publication Data
US 2018/0020638 A1  Jan. 25, 2018

Related U.S. Application Data

(60) Provisional application No. 62/364,952, filed on Jul. 21, 2016.

(51) Int. Cl.
*A01K 5/02* (2006.01)

(52) U.S. Cl.
CPC .......... *A01K 5/0225* (2013.01); *A01K 5/0266* (2013.01); *A01K 5/0291* (2013.01)

(58) Field of Classification Search
CPC .. A01K 5/0225; A01K 5/0291; A01K 5/0275; A01K 5/0266
USPC .... 119/51.11, 51.12, 52.1, 56.1, 57.1, 57.92, 119/61.2
See application file for complete search history.

(56) References Cited

U.S. PATENT DOCUMENTS

| | | | | |
|---|---|---|---|---|
| 4,656,969 A * | 4/1987 | Rapp | .................... | A01K 5/0225 119/51.11 |
| 5,275,130 A * | 1/1994 | Muckler | .............. | A01K 5/0233 119/53.5 |
| 5,899,169 A * | 5/1999 | Jenson | ................. | A01K 5/0291 119/51.11 |
| 2005/0126501 A1* | 6/2005 | Davis | .................... | A01K 5/0225 119/51.01 |
| 2005/0241588 A1* | 11/2005 | Foster | .................. | A01K 5/0225 119/57.91 |
| 2007/0044724 A1* | 3/2007 | Kvols | ....................... | A01K 5/01 119/56.1 |
| 2008/0029034 A1* | 2/2008 | Busbice | ................. | A01K 5/025 119/51.11 |
| 2010/0147223 A1* | 6/2010 | Kruse | .................. | A01K 5/0107 119/57.5 |
| 2013/0036977 A1* | 2/2013 | Kalnay | .................... | A01K 5/02 119/51.02 |
| 2013/0192527 A1* | 8/2013 | Reid | .................... | A01K 5/0225 119/51.11 |
| 2015/0189855 A1* | 7/2015 | Norris | ................. | A01K 5/0291 119/57.1 |
| 2016/0066539 A1* | 3/2016 | Leissner | .............. | A01K 5/0291 119/51.11 |
| 2016/0227736 A1* | 8/2016 | Monk | ...................... | A01K 5/02 |

* cited by examiner

*Primary Examiner* — Kathleen I Alker (57) ABSTRACT

An automated livestock feeder consists of a feeder body, a plurality of supports, an actuating mechanism, a control system, and a power source. The feeder body has an internal feed reservoir, a dispenser aperture, a dispenser door, a fill aperture, and a fill door. The actuating mechanism is engaged with the dispenser door to open and close the dispenser door over the dispenser aperture in order to dispense livestock feed from the feed reservoir into a trough. The control system can be programmed to automatically dispense feed at pre-programmed times or intervals.

12 Claims, 6 Drawing Sheets

AUTOMATIC LIVESTOCK FEEDER

The current application claims a priority to the U.S. Provisional Patent application Ser. No. 62/364,952 filed on Jul. 21, 2016.

FIELD OF THE INVENTION

The present invention relates generally to livestock feeding. More particularly, the present invention relates to automated dispensement of livestock feed.

BACKGROUND OF THE INVENTION

Among the primary concerns for those who manage farms and livestock facilities in general is the feeding of their animals. In order to breed the largest, healthiest livestock possible, cattle, sheep, and more require large amounts of feed at precise intervals during the day. This becomes problematic for a single farm manager to deal with, as other responsibilities may require attention on the other side of a field. Current troughs are large and often difficult to move of manipulate. Current feeder systems may be difficult to utilize, as they are bulky and not conducive to movement. What is needed is a device that will allow for the containment of large amounts of feed that can also automatically dispense the feed into a trough at desirable intervals and amounts. What is further needed is a device that is optimized for transport across large areas.

The present invention addresses these issues. The present invention has a large container for holding livestock feed. The solar-powered actuators beneath the chamber of the livestock feed holder open and close the chamber, allowing feed to flow into the attached trough below at a controlled rate. The control panel allows the user to input exactly how long the chamber should be open, how wide, for how long, and with a set amount of time in between feeding cycles. A beeper alerts the livestock and the user as to when the chamber is open and the feed is being poured. The present invention allows for the automated management of feed cycles, and can be transported across fields or large areas of land.

DETAIL DESCRIPTIONS OF THE INVENTION

All illustrations of the drawings are for the purpose of describing selected versions of the present invention and are not intended to limit the scope of the present invention. The present invention is to be described in detail and is provided in a manner that establishes a thorough understanding of the present invention. There may be aspects of the present invention that may be practiced or utilized without the implementation of some features as they are described. It should be understood that some details have not been described in detail in order to not unnecessarily obscure focus of the invention.

The present invention is an automated livestock feeder that facilitates management of livestock feed. Referring to FIGS. 1-6, the present invention generally comprises a feeder body 1, a plurality of supports 2, an actuating mechanism 3, a control system 4, and a power source 5.

The feeder body 1 comprises a feed reservoir 11, a dispenser aperture 12, a dispenser door 13, a fill aperture 14, and a fill door 15.

The feed reservoir 11 is positioned within the feeder body 1. The feed reservoir 11 is the area which, in the preferred usage of the present invention, holds a large volume of feed that is being prepared for dispensing. The feed reservoir 11 is filled by the user with livestock feed through the fill door 15 as necessary. In some embodiments, the user may only have to refill the feed reservoir 11 with livestock feed a few times a month, depending on the amount of livestock the user needs to tend to.

The fill aperture 14 traverses through the feeder body 1 into the feed reservoir. The fill door 15 is connected to the feeder body 1 over the fill aperture 14. The fill door 15 may be attached to the feeder body 1 via a hinge, or via a sliding mechanism, or via any other useful means known in the art. The fill door 15 allows the user to supply the feed reservoir 11 with livestock feed.

The dispenser aperture 12 traverses through the feeder body 1 into the feed reservoir 11. The dispenser aperture 12 is generally located at the bottom of the feeder body 1, so that livestock feed may be dispensed by gravity through opening the dispenser door 13 such that the livestock feed falls out of the bottom of the feeder body 1.

It is contemplated that in various embodiments, the structure of the feeder body 1 may take many various forms. However, in one embodiment, the cross-section of the feeder body 1 is an irregular pentagon with two parallel sides, resembling the shape of a baseball field's home plate. Thus, the feeder body 1 may further comprise a plurality of walls 16. In some embodiments, the feed reservoir 11 is defined and enclosed by the plurality of walls 16. In some embodiments, the plurality of walls 16 comprises a first side wall 161, a second side wall 162, a front wall 163, a rear wall 164, at least one top wall 165, a front underside wall 166, and a rear underside wall 167. In other embodiments, the plurality of walls 16 may have alternative configurations.

The first side wall 161 and the second side wall 162 are positioned opposite each other laterally along the feeder body 1. The front wall 163, the rear wall 164, the at least one top wall 165, and the rear underside wall 167 are connected between the first side wall 161 and the second side wall 162.

The front underside wall 166 is terminally connected between the rear underside wall 167 and the front wall 163. The rear underside wall 167 is terminally connected between the front underside wall 166 and the rear wall 164. The at least one top wall 165 is terminally connected between the front wall 163 and the rear wall 164. In one embodiment, the dispenser aperture 12 traverses through the front underside wall 166 adjacent to the rear underside wall 167. The present invention may further comprise a battery box, access panel or other similar features for storing a battery or other electronic components. Moreover, the present invention may further comprise at least one handle, preferably connected to the front wall 163, providing leverage for the user while the user accesses the battery box.

It is contemplated that the actuating mechanism 3 may be any mechanism that can facilitate dispensing of livestock feed through the dispenser aperture 12. For example, in some embodiments the actuating mechanism 3 may comprise a screw or auger mechanism or other rotating mechanism, or a plunger mechanism configured to dispense a specific volume of feed.

In the preferred embodiment, the actuating mechanism 3 is operatively connected between the feeder body 1 and the dispenser door 13 such that the actuating mechanism 3 is configured to open and shut the dispenser door 13 in order to control the dispensing of livestock feed from the feed reservoir 11. In some embodiments, the actuating mechanism 3 is operatively engaged between the front underside wall 166 and the dispenser door 13, while the fill aperture 14 traverses through one of the at least one top wall 165. Moreover, multiple fill apertures 14 may be comprised in alternative embodiments.

Figure 1:
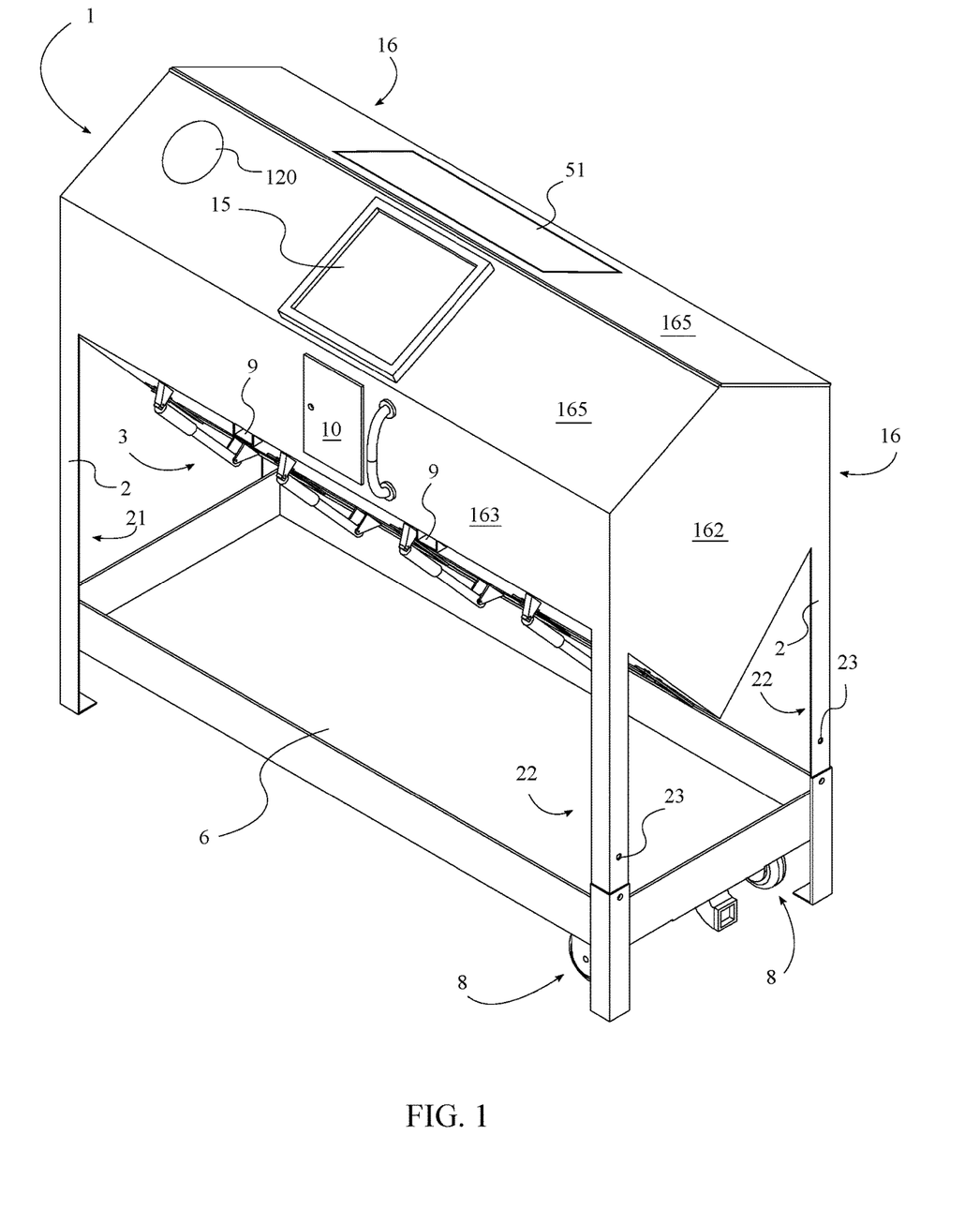
FIG. 1 is a perspective view of the present invention.
Figure 2:
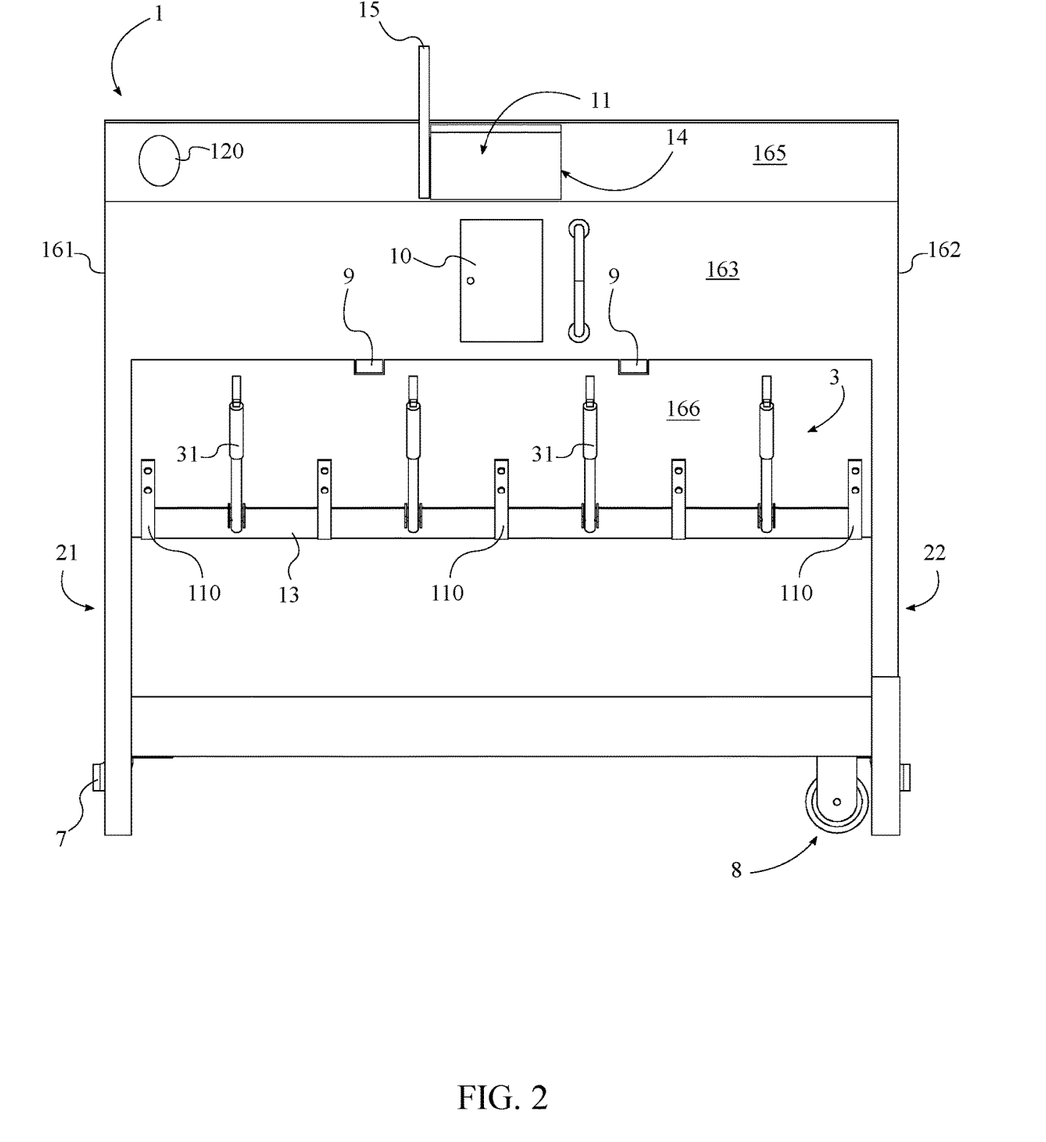
FIG. 2 is a front view of the present invention with the dispenser door closed.
Figure 3:
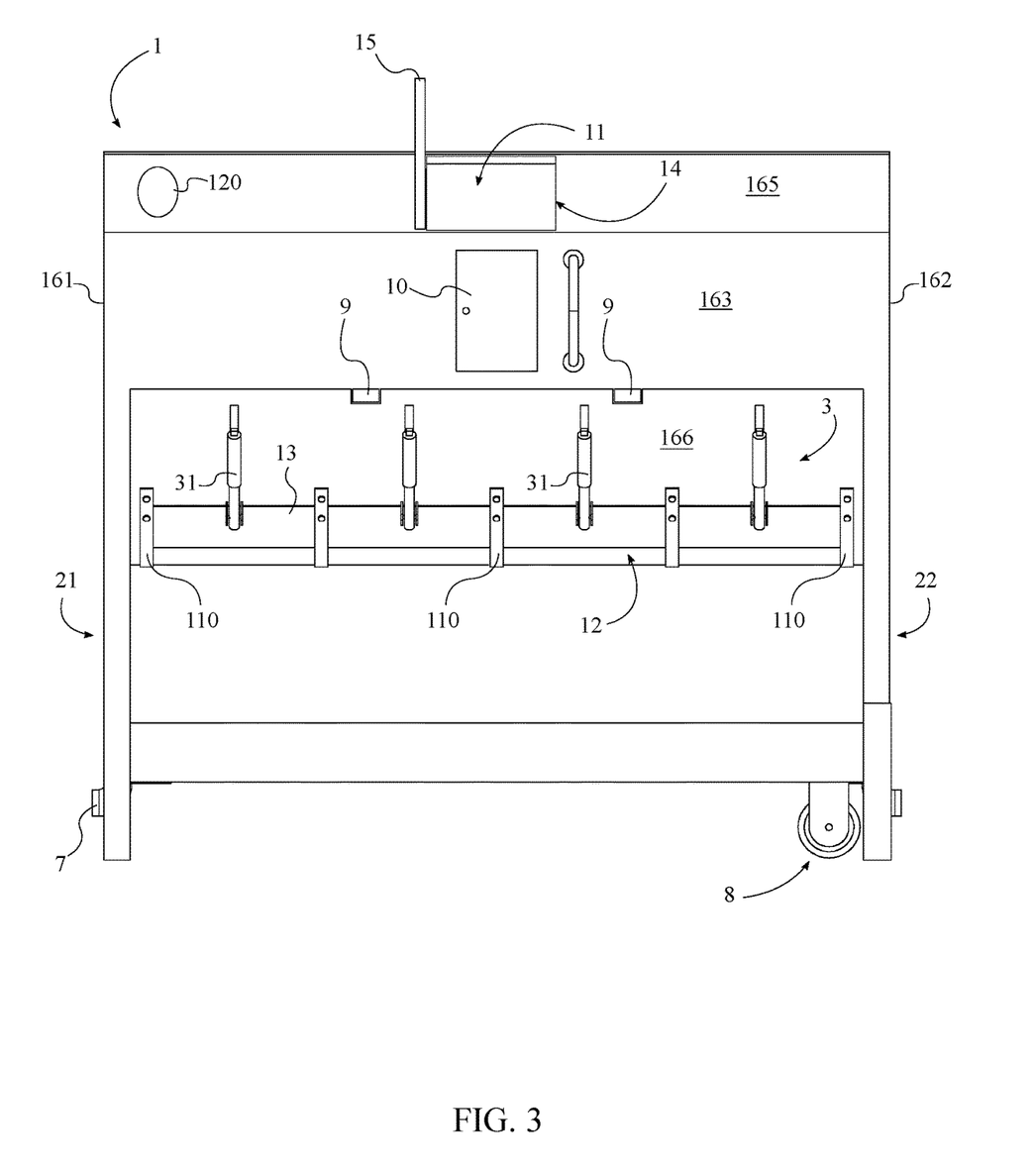
FIG. 3 is a front view of the present invention with the dispenser door open, exposing the dispenser aperture into the feed reservoir.

In the preferred embodiment, the actuating mechanism 3 comprises a plurality of linear hydraulic actuators 31. The plurality of linear hydraulic actuators 31 is laterally distributed along the feeder body 1, wherein the lateral direction is defined between the first side wall 161 and the second side wall 162. The plurality of linear hydraulic actuators 31 is operatively connected between the front underside wall 166 of the feeder body 1 and the dispenser door 13. In some embodiments, the actuating mechanism 3 may comprise other types of actuators, such as, but not limited to, pneumatic actuators, electric actuators, or other types of actuators. In the preferred embodiment, the plurality of linear hydraulic actuators 31 functions to open the dispenser door 13 by linearly pulling the dispenser door 13 away from the dispenser aperture 12, exposing the dispenser aperture 12 and allowing livestock feed to fall through the dispensing aperture 12 from the feed reservoir 11. This is illustrated in FIGS. 2-3. In another embodiment, the actuating mechanism 3 may be configured to rotate the dispenser door 13 away from the dispenser aperture 12 as opposed to the aforementioned linear sliding motion.

In some embodiments, the present invention further comprises a plurality of support brackets 110 connected to the front underside wall 166 of the feeder body 1. The dispenser door 13 is positioned within the plurality of support brackets 110 and slides within the brackets while being opened to dispense feed. The plurality of support brackets 110 act as a guide for the dispenser door 13.

The plurality of supports 2 is connected to an underside of the feeder body 1, so that the feeder body 1 is suspended off the ground or other supporting surface the present invention is placed on. The plurality of supports 2 is distributed around the feeder body 1 in a manner conducive to the aforementioned functionality of the supports. In the preferred embodiment, the plurality of supports 2 comprises four supports, each connected at a different corner of the feeder body 1. In some embodiments, each of the plurality of supports 2 comprises at least one hole 23, the at least one hole 23 traversing laterally through each of the plurality of supports 2. Alternatively, in some embodiments, only one or more of the plurality of supports 2 may comprise at least one hole 23. The hole 23 of the supports facilitates multiple units of the present invention being fastened together in a side-by-side fashion. This secures the units in place against forces which may be applied to the present invention by livestock during feeding.

The control system 4 may be any unit or combination of units that facilitates control of the electrical and electronic components of the present invention. The control system 4 may comprise, but is not limited to: a microprocessor, relays, or any other useful or necessary electronic components for operating the electronic capabilities of the present invention for automated dispensing of feed. The control system 4 is electronically connected to the actuating mechanism 3 and to the control system 4.

The power source 5 is electrically connected to the actuating mechanism 3. The power source 5 may be any source of electrical power, such as, but not limited to, batteries, a wired cable power connection, a solar panel 51, or one or more of the aforementioned power sources 5 in combination. In the preferred embodiment, the power source 5 comprises or may utilize a solar panel 51 connected atop the feeder body 1. The solar panel 51 converts the sun's energy into electrical energy to be used for the automation of the present invention. One or more solar panels 51 may be utilized. The power source 5 may further comprise a battery charged by the solar panel 51 for operation when sunlight is not available.

Figure 4:
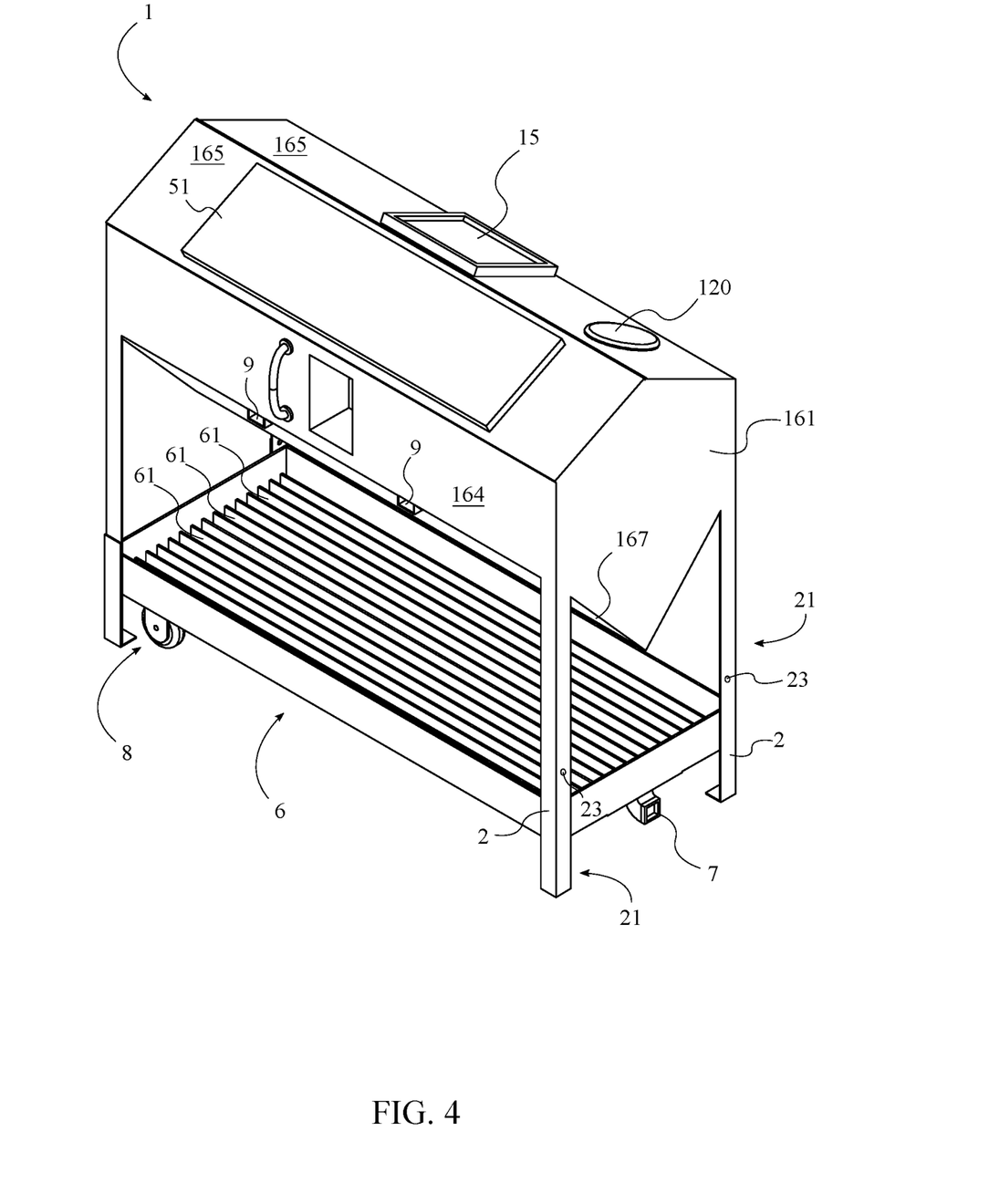
FIG. 4 is a rear perspective view of one embodiment of the present invention.
Figure 5:
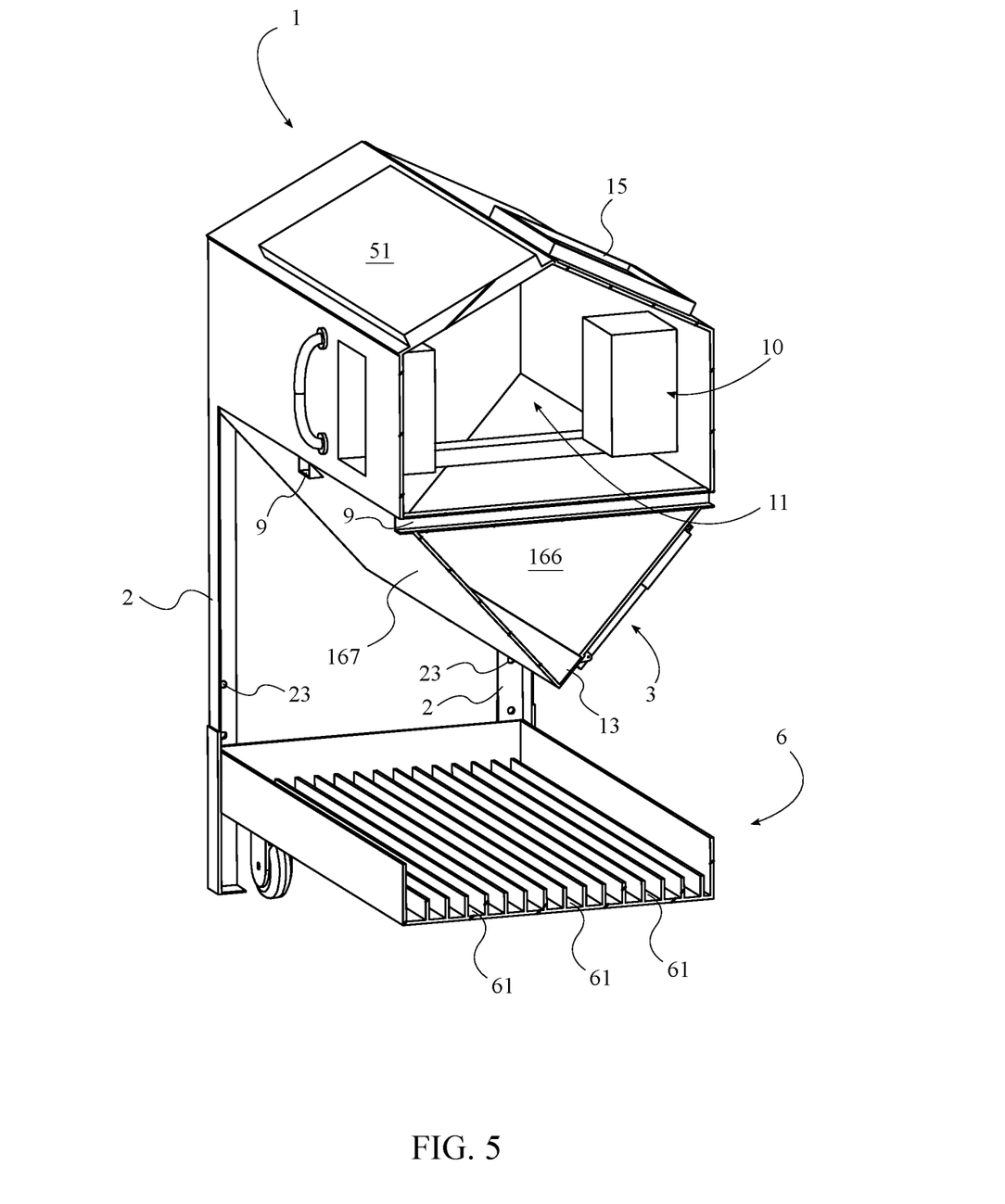
FIG. 5 is a perspective cross-sectional view of the present invention.
Figure 6:
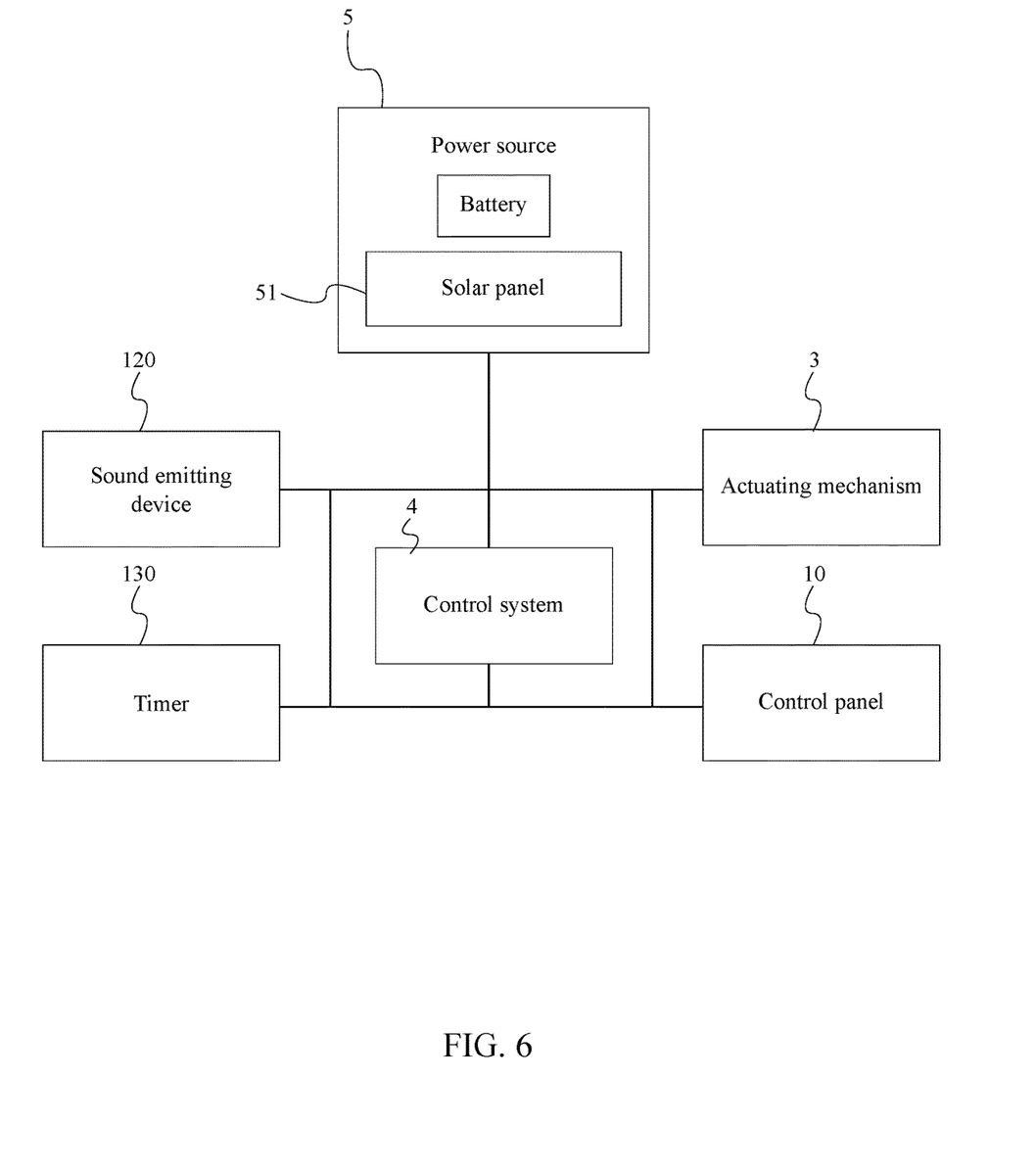
FIG. 6 is a diagram of the electronic components of the present invention.

In some embodiments, the present invention may further comprise a trough 6. The trough 6 is the component which holds feed that has been dispensed from the chamber through the open lip. The trough 6 may be connected to the plurality of supports 2 opposite the feeder body 1 along the plurality of supports 2, underneath the feeder body 1 to catch dispensed feed. The trough 6 may be welded to the plurality of supports 2, preferably at a height such that livestock can easily access feed that has been dispensed within. In some embodiments, the trough 6 may comprise a plurality of channels 61, as can be seen in FIGS. 4-5. The plurality of channels 61 traverses laterally across the trough 6. This makes it more difficult for livestock to retrieve feed from the trough 6, thus promoting circulation of livestock so that one or more animals do not occupy the feeder for a long time, preventing other animals from being fed.

In some embodiments, the present invention further comprises a hitch connection 7 and a pair of wheels 8. Furthermore, the plurality of supports 2 may further comprise a first pair of side supports 21 and a second pair of side supports 22. The first pair of side supports 21 is connected to the feeder body 1 adjacent to the first side wall 161 of the feeder body 1. The second pair of side supports 22 is connected to the feeder body 1 adjacent to the second side wall 162 of the feeder body 1.

The hitch connection 7 is connected to the trough 6 opposite the feeder body 1 between the first pair of side supports 21, and the pair of wheels 8 is connected to the second pair of side supports 22. In some embodiments, the pair of wheels 8 is connected directly to the trough 6 instead. Regardless, the present invention in many embodiments may be configured to be towed by a vehicle.

In some embodiments, the present invention may further comprise a plurality of lift holes 9 traversing through the feeder body 1. Said lift holes 9 allow the present invention to be transported by the prongs of a hay lift, fork lift, or another similar vehicle or tool. In some embodiments, the lift holes 9 are a set of hollow, preferably rectangular extrusions extending from the front wall 163, through the feed reservoir 11, and out of the rear wall 164. The lift holes allow for the insertion of the prongs of a hay lift or a forklift into the present invention, which can subsequently be moved from one location to another using the forklift or hay lift.

Some embodiments further comprise a control panel 10 that is externally connected to the feeder body 1, electronically connected to the control system 4, and electrically connected to the power source 5. The control panel 10 may facilitate programming and operation of the electronic components of the present invention for automating feed dispensing. The control panel 10 may comprise a liquid crystal display (LCD) screen for input of commands and/or displaying options or states of the system.

In some embodiments, the present invention further comprises at least one sound emitting device 120. The sound emitting device 120 may be externally connected to the feeder body 1, or may be internal to the feeder body 1. The sound emitting device 120 may be electrically connected to the power source 5, or have its own power source 5. The sound emitting device 120 may further be electronically connected to the control system 4. The sound emitting device 120 may be programmed in conjunction with the actuating mechanism 3 to alert livestock in the surrounding area to the dispensing of feed. In some embodiments, the present invention comprises as least one timer 130 that is electrically connected to the sound emitting device 120. In some embodiments, a second timer 130 is utilized to stagger the activation of the sound emitting device 120 and the dispensing of feed.

In some embodiments, the present invention may be configured to be installed onto a trailer for ease of transportation of the unit. In some embodiments, the present invention may further comprise a trailer frame, with the plurality of supports 2 and/or the trough 6 connected atop the trailer frame. One or more jack mechanisms may further be attached to the trailer frame in order to facilitate attachment or detachment of the trailer frame to a vehicle. Furthermore, the trailer frame may further comprise support legs which can be raised and lowered for transport or support for the trailer frame. In some embodiments, the trailer frame may further comprise a lowering mechanism that allows the trough 6 to be lowered to the appropriate height for feeding.

In some embodiments, the present invention may be programmed for up to 28 timed feedings per day, and may support 200 head of cattle with 15 units of the present invention lined up end to end. The present invention may only require filling twice per winter, thereby saving labor.

In some embodiments, the first set of supports comprises a plurality of feet, a plurality of holes, and at least two pins. The plurality of feet extends over the first pair of supports, below the bottom of the at least two wheels, and slide parallel to the first pair of supports. The plurality of holes is a set of equally-sized holes arranged in a vertical line midway between the width of the first pair of supports, and comprises at least one foot hole. The at least one foot hole of the plurality of holes goes through the plurality of feet. In this arrangement, the at least two pins are inserted through a hole of the at least one foot hole and through one of the plurality of holes to secure a foot of the plurality of feet into position. This arrangement allows the plurality of feet to be lifted above the at least two wheels for transportation, or below the at least two wheels when the present invention has been moved to an appropriate position.

The present invention may further comprise a bar. The bar is a rigid rectangular extrusion meant to connect several units of the present invention together, thus ensuring that they are in a straight line.

In the preferred usage of the present invention, the user first obtains a unit of the present invention. In order to transport the present invention, the user first attaches a jack to the receiver of the first end of the trough. The user then activates the jack in order to lift the first end of the trough off the ground. The user then pulls the at least two pins from the plurality of holes of the first set of supports. The user slides the feet up, matches the at least one foot hole to the plurality of holes on the first set of supports, and secures the plurality of feet into place by pressing the at least two pins through the plurality of holes. The user then releases the jack and removes it from the first end of the trough. The present invention is now being supported by the at least two wheels and the second set of supports. The user then moves the jack to the second end of the trough and activates the jack in order to lift the second end off of the ground. The user then attaches the receiver to a truck hitch. The present invention is now being supported by the at least two wheels and by the truck, and is now ready to be moves to a location of preference. The user reverses the above process to place the present invention into a new location. Once the present invention has been moved, the user programs the opening and closing of the dispenser using the control panel in the battery box. When completed, the user then opens the fill door and inserts feed into the feed reservoir before closing the door. The present invention is now activated and ready for use. The user may also choose to utilize the bar to join multiple units of the present invention together end to end, providing a long, even line of units of the present invention.

Although the invention has been explained in relation to its preferred embodiment, it is to be understood that many other possible modifications and variations can be made without departing from the spirit and scope of the invention as hereinafter claimed.

What is claimed is:

1. An automated livestock feeder comprising:
   a feeder body;
   a feed reservoir;
   a dispenser aperture;
   a dispenser door;
   a fill aperture;
   a fill door;
   a plurality of supports;
   an actuating mechanism;
   a trough;
   a plurality of rectangular hollow extrusions;
   a control system;
   a power source;
   the feed reservoir being positioned within the feeder body;
   the fill aperture traversing through the feeder body into the feed reservoir;
   the fill door being connected to the feeder body over the fill aperture;
   the dispenser aperture traversing through the feeder body into the feed reservoir;
   the actuating mechanism being operatively connected in between the feeder body and the dispenser door;
   the actuating mechanism being configured to open and shut the dispenser door in order to control dispensing of livestock feed from the feed reservoir;
   the plurality of supports being connected to an underside of the feeder body;
   the feeder body being suspended by the plurality of supports;
   the plurality of supports being distributed around the feeder body;
   the trough being connected to the plurality of supports;
   the trough being oppositely positioned relative to the feeder body;
   the trough comprising a trough body, a plurality of channels and a plurality of vertical members;
   each of the plurality of channels laterally traversing across the trough body;

each of the plurality of vertical members being erected laterally along the trough body;
a corresponding channel among the plurality of channels being formed in between two adjacent vertical members among the plurality of vertical members;
each of the plurality of rectangular hollow extrusions extending from a front wall of the feeder body, through the feed reservoir and to a rear wall of the feeder body;
the control system being electronically connected to the actuating mechanism; and
the power source being electrically connected to the actuating mechanism and the control system.

2. The automated livestock feeder as claimed in claim 1 comprising:
the feeder body comprising a plurality of walls;
the feed reservoir being defined by the plurality of walls;
the plurality of walls comprising a first side wall, a second side wall, the front wall, the rear wall, at least one top wall, a front underside wall and a rear underside wall;
the first side wall and the second side wall being oppositely positioned to each other along the feeder body;
the front wall, the rear wall, the at least one top wall, the front underside wall and the rear underside wall being connected in between the first side wall and the second side wall;
the front underside wall being terminally connected in between the rear underside wall and the front wall;
the rear underside wall being terminally connected in between the front underside wall and the rear wall;
the at least one top wall being terminally connected in between the front wall and the rear wall;
the dispenser aperture traversing through the front underside wall;
the dispenser aperture being adjacently positioned to the rear underside wall;
the actuating mechanism being operatively engaged in between the front underside wall and the dispenser door; and
the fill aperture traversing through the at least one top wall.

3. The automated livestock feeder as claimed in claim 1 comprising:
a hitch connection;
a pair of wheels;
the plurality of supports comprising a pair of first side supports and a pair of second side supports;
the pair of first side supports being connected to the feeder body;
the pair of first side supports being adjacently positioned to a first side wall of the feeder body;
the pair of second side supports being connected to the feeder body;
the pair of second side supports being adjacently positioned to a second side wall of the feeder body;
the hitch connection being connected to the trough;
the hitch connection being oppositely positioned to the feeder body;
the hitch connection being positioned in between the pair of first side supports; and
the pair of wheels being connected to the pair of second side supports.

4. The automated livestock feeder as claimed in claim 1 comprising:
the power source comprising a solar panel; and
the solar panel being connected atop the feeder body.

5. The automated livestock feeder as claimed in claim 1 comprising:
a control panel;
the control panel being externally connected to the feeder body;
the control panel being electronically connected to the control system; and
the control panel being electrically connected to the power source.

6. The automated livestock feeder as claimed in claim 1 comprising:
the actuating mechanism comprising a plurality of linear actuators.

7. The automated livestock feeder as claimed in claim 6 comprising:
the plurality of linear actuators being laterally distributed along the feeder body; and
each of the plurality of linear actuators being operatively connected in between a front underside wall of the feeder body and the dispenser door.

8. The automated livestock feeder as claimed in claim 6 comprising:
each of the plurality of linear actuators is a linear hydraulic actuator.

9. The automated livestock feeder as claimed in claim 1 comprising:
a plurality of support brackets;
the plurality of brackets being connected to a front underside wall of the feeder body; and
the dispenser door being positioned within the plurality of support brackets.

10. The automated livestock feeder as claimed in claim 1 comprising:
a sound emitting device;
the sound emitting device being externally connected to the feeder body;
the sound emitting device being electrically connected to the power source; and
the sound emitting device being electronically connected to the control system.

11. The automated livestock feeder as claimed in claim 1 comprising:
at least one timer; and
the at least one timer being electrically connected to a sound emitting device.

12. The automated livestock feeder as claimed in claim 1 comprising:
each of the plurality of supports comprising at least one hole; and
the at least one hole laterally traversing through each of the plurality of supports.

* * * * *